(12) United States Patent
Sun et al.

(10) Patent No.: US 9,236,912 B2
(45) Date of Patent: Jan. 12, 2016

(54) DUAL INPUT SINGLE OUTPUT POWER MULTIPLEXER FOR NEAR FIELD COMMUNICATION APPLICATION

(71) Applicant: Fairchild Semiconductor Corporation, San Jose, CA (US)

(72) Inventors: Ni Sun, Sunnyvale, CA (US); Jeongil Lee, Santa Clara, CA (US); Sam Zheng, Shanghai (CN)

(73) Assignee: Fairchild Semiconductor Corporation, San Jose, CA (US)

( * ) Notice: Subject to any disclaimer, the term of this patent is extended or adjusted under 35 U.S.C. 154(b) by 470 days.

(21) Appl. No.: 13/684,430

(22) Filed: Nov. 23, 2012

(65) Prior Publication Data

US 2013/0169059 A1    Jul. 4, 2013

Related U.S. Application Data

(60) Provisional application No. 61/562,609, filed on Nov. 22, 2011, provisional application No. 61/562,722, filed on Nov. 22, 2011, provisional application No. 61/567,438, filed on Dec. 6, 2011.

(51) Int. Cl.
*H01F 27/00* (2006.01)
*H04B 5/00* (2006.01)

(52) U.S. Cl.
CPC .................................. *H04B 5/0037* (2013.01)

(58) Field of Classification Search
CPC ........................................................ H02J 5/005
USPC ......................................................... 307/104
See application file for complete search history.

(56) References Cited

U.S. PATENT DOCUMENTS

| | | |
|---|---|---|
| 5,398,182 A | 3/1995 | Crosby |
| 5,485,073 A | 1/1996 | Kasashima et al. |
| 5,539,610 A | 7/1996 | Williams et al. |
| 5,594,381 A | 1/1997 | Bingham |
| 5,726,505 A | 3/1998 | Yamada et al. |
| 6,021,332 A | 2/2000 | Alberth, Jr. et al. |

(Continued)

FOREIGN PATENT DOCUMENTS

| | | |
|---|---|---|
| CN | 101378558 A | 3/2009 |
| CN | 101557122 | 10/2009 |

(Continued)

OTHER PUBLICATIONS

Texas Instruments—TPS2114A/TPS2115A, Autoswitching Power Mux, Mar. 2004, Revised May 2012, 28 pages.

(Continued)

*Primary Examiner* — Stephen W Jackson
(74) *Attorney, Agent, or Firm* — Grossman Tucker Perreault & Pfleger PLLC

(57) ABSTRACT

Generally, this disclosure provides systems, methods and platforms for power multiplexer switching operations. The system may include a near field communication (NFC) module configured to receive power through a radio frequency (RF) channel; a subscriber identity module (SIM) circuit configured with a supply voltage port; and a power multiplexer circuit configured to controllably couple the SIM circuit supply voltage port to the NFC module, wherein the NFC module provides a supply voltage to the SIM circuit such that the SIM circuit is operable in the absence of primary device power source.

20 Claims, 9 Drawing Sheets

(56) References Cited

U.S. PATENT DOCUMENTS

| | | |
|---|---|---|
| 6,351,175 B1 | 2/2002 | Rapp |
| 6,452,362 B1 | 9/2002 | Choo |
| 6,541,947 B1 | 4/2003 | Dittmer et al. |
| 7,414,330 B2 | 8/2008 | Chen |
| 7,451,414 B2 | 11/2008 | Groos |
| 7,554,285 B2 | 6/2009 | Simoes et al. |
| 8,203,234 B2 | 6/2012 | Lee et al. |
| 8,428,513 B2 * | 4/2013 | Sklovsky et al. ............ 455/41.2 |
| 8,619,400 B2 | 12/2013 | Dobkin et al. |
| 8,941,264 B2 | 1/2015 | Scruggs et al. |
| 2004/0155627 A1 | 8/2004 | Stanesti et al. |
| 2005/0037241 A1 | 2/2005 | Schneider et al. |
| 2005/0184715 A1 | 8/2005 | Kidokoro et al. |
| 2005/0285676 A1 | 12/2005 | Jones |
| 2010/0130263 A1 | 5/2010 | Zhang et al. |
| 2010/0231047 A1 | 9/2010 | Lee et al. |
| 2012/0106021 A1 | 5/2012 | Suchoff |
| 2012/0287540 A1 | 11/2012 | Dobkin et al. |

FOREIGN PATENT DOCUMENTS

| | | |
|---|---|---|
| JP | 2004-280704 | 10/2004 |
| JP | 2008-029160 | 2/2008 |

OTHER PUBLICATIONS

Analogic Tech—AAT4674, Power Supply Selector Switch, Sep. 2007, 13 pages.

On Semiconductor—CAT6500, 3.0 A Power Selector Switch, Aug. 2011, Rev. 1, 13 pages.

Fairchild Semiconductor—FPF1320 / FPF1321, IntelliMAX(TM) Dual-Input Single-Output Advanced Power Switch with True Reverse-Current Blocking, Jan. 2012, Rev. 1.0.0, 16 pages.

International Search Report and Written Opinion dated Aug. 16, 2012 issued in PCT Patent Application No. PCT/ CN2011/082758, 12 pages.

Fairchild Semiconductor—FPF3040, IntelliMAX(TM) 20 V-Rated Dual Input Single Output Power-Source-Selector Switch, Sep. 2012, Rev. 2.4.0, 12 pages.

Paul Horowitz et al., The Art of Electronics, 1989, Cambridge University Press, Second Edition, pp. 230-232.

\* cited by examiner

| Select | Enable | Vout |
|--------|--------|------|
| Low    | High   | VinA |
| High   | High   | VinB |

| EN | $V_{IN}$>UVLO | $V_{BUS}$>UVLO | $V_{IN\_SEL}$ | DF_IN | Other $V_{IN\_AVA}$ | $V_{OUT}$ | Comment |
|---|---|---|---|---|---|---|---|
| HIGH | X | YES | LOW | X | HI-Z if $V_{IN}$>UVLO LOW if $V_{IN}$<UVLO | $V_{BUS}$ | $V_{OUT}$ is selected by $V_{IN\_SEL}$ |
| HIGH | YES | X | HIGH | X | HI-Z if $V_{BUS}$>UVLO LOW if $V_{BUS}$<UVLO | $V_{IN}$ | $V_{OUT}$ is selected by $V_{IN\_SEL}$ |
| HIGH | NO | X | HIGH | X | LOW | Floating | Reverse power allowed at $V_{IN}$ |
| HIGH | X | NO | LOW | X | LOW | OTG | Reverse power allowed at $V_{BUS}$ |
| LOW | YES | NO | X | X | LOW | $V_{IN}$ | Automatic selection to valid input. |
| LOW | NO | YES | X | X | LOW | $V_{BUS}$ | |
| LOW | YES | YES | X | Floating | HIGH | $V_{BUS}$ | $V_{OUT}$ is selected by DF_IN. |
| LOW | YES | YES | X | LOW | HIGH | $V_{IN}$ | |
| LOW | NO | NO | X | X | LOW | Floating | OFF |

FIG. 9

DUAL INPUT SINGLE OUTPUT POWER MULTIPLEXER FOR NEAR FIELD COMMUNICATION APPLICATION

CROSS REFERENCE TO RELATED APPLICATIONS

This application claims the benefit of U.S. provisional patent applications: Ser. No. 61/562,609 filed Nov. 22, 2011; Ser. No. 61/562,722 filed Nov. 22, 2011; and Ser. No. 61/567,438 filed Dec. 6, 2011, which are incorporated fully herein by reference.

FIELD

The present disclosure relates to a power multiplexer, and more particularly, to a dual input single output (DISO) power multiplexer for a near field communication application.

BACKGROUND

Power multiplexer switches typically link a power supply with a device to be powered (a load) and provide switching control to couple or de-couple the load from the supply based on a switching signal. Examples loads that may be controlled by a load switch include portable devices such as phones, digital cameras, media players, Global Positioning System (GPS) receivers and portable games. Load switches may provide limited or no protection, however, against reverse current flow from the load back to the power supply, which can damage sensitive and/or valuable components. This lack of reverse current flow protection is particularly common when the switch is in an off or open state.

Additionally, many electronic devices, particularly portable devices such as mobile phones, are powered by batteries. Batteries eventually run low on power forcing an interruption in the use of the device. Either the battery must be replaced or recharged, which may be inconvenient and time consuming. In the case of a mobile phone, for example, a low battery may cause the a loss of power to the phones Subscriber Identity Module (SIM) circuit card.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 2 illustrates a system truth table consistent with various embodiments of the present disclosure;

FIG. 9 illustrates a system truth table consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides a dual input single output (DISO) power multiplexer configured for use with a near field communication (NFC) module. The DISO power multiplexer may provide true reverse current blocking (TRCB) and may be implemented in a single integrated circuit that is operable at reduced voltages. The power multiplexer provides protection in the form of reverse current blocking which prevents current from flowing back from the load $V_{OUT}$ to the channel inputs $V_{inA}$ and $V_{inB}$ regardless of the state of each channel input switch being open or closed (i.e., on or off). This type of reverse current blocking, which provides protection whether the switch is on or off, is also referred to as TRCB. The DISO power multiplexer may enable power to be provided from the NFC module to a Subscriber Identity Module (SIM) circuit card, for example in a mobile phone, to allow the SIM card to be operable even though power from a conventional source such as a Power Management Unit (PMU) is unavailable, for example, when the phone is powered off.

In some embodiments the power multiplexer may be slew rate controlled. In some embodiments, the power multiplexer may be part of a power path management system configured for use with universal serial bus (USB) and wireless charger applications.

Figure 1:
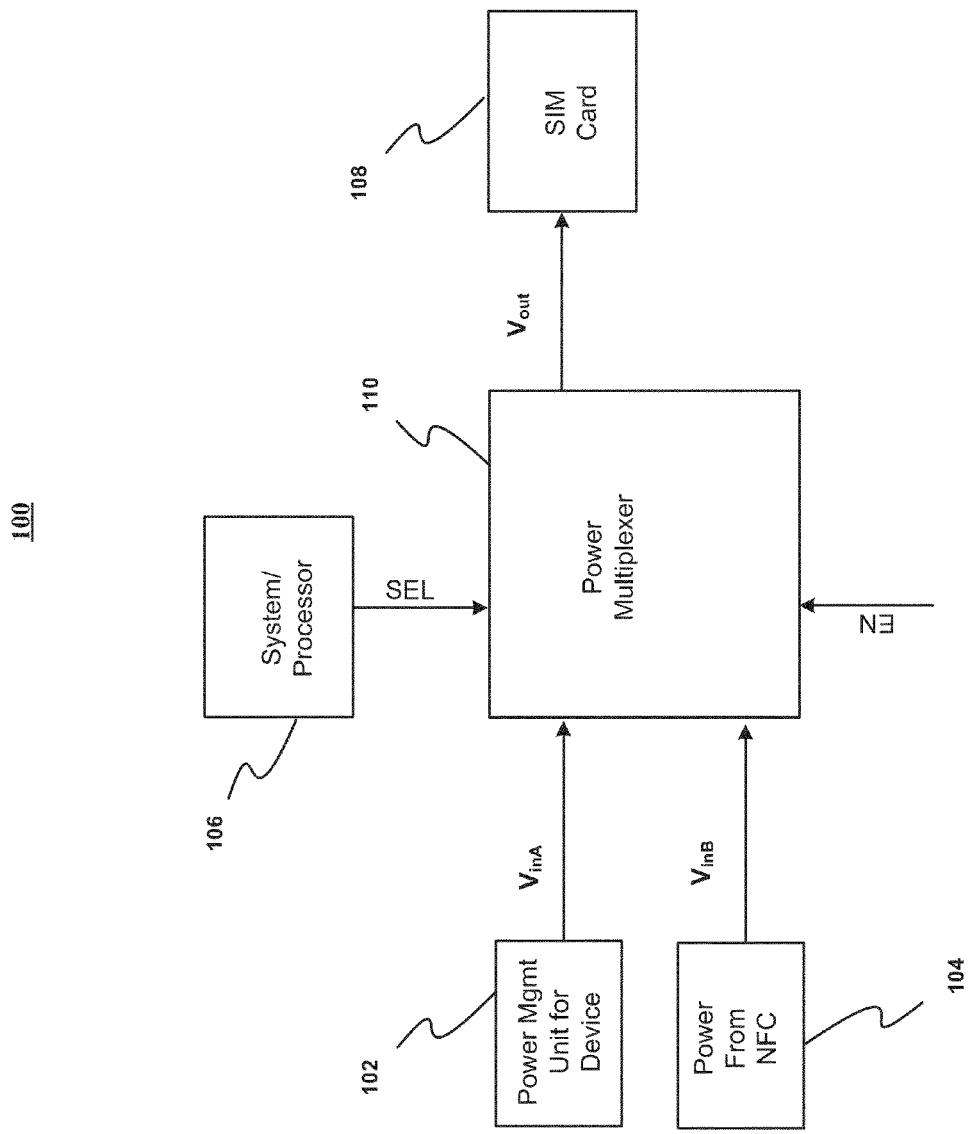
FIG. 1 illustrates a system block diagram consistent with various embodiments of the present disclosure.

FIG. 1 illustrates a system block diagram 100 consistent with various embodiments of the present disclosure. Two power sources 102, 104 supply input voltages $V_{inA}$ and $V_{inB}$ respectively to the power multiplexer 110. Power source 102 may be provided from a PMU or power management integrated circuit (PMIC) associated with a device such as a mobile phone or other portable wireless device. Power source 102 may typically provide power while the device is turned on. Power source 104 may be provided from an NFC module which receives power wirelessly from a second, or external, device having NFC power transmitting capability. The supply voltage range from the NFC module may be 1.8 volts or less, and thus the power multiplexer may be capable of operation under reduced voltage conditions. This enables power to be provided from the external NFC device to the current device even when the current device is turned off. The power multiplexer 110 may be configured to switch between inputs $V_{inA}$ and $V_{inB}$ and electrically couple one of the inputs to an output port $V_{out}$. $V_{out}$ may then be provided to power, for example, a SIM card 108 in a mobile phone. The SIM card may thus be powered on, through an NFC connection, even though the phone device is powered off.

The power multiplexer 110 may further be configured to provide TRCB between $V_{out}$ and $V_{inA}$ in channel A, and between $V_{out}$ and $V_{inB}$ in channel B. In some embodiments, control signals, including an enable and a select may also be provided to the power multiplexer 110, as will be explained below. In some embodiments, the select signal may be provided by a system 106, for example, a processor or control circuitry in a mobile phone. In some embodiments, the enable may be held at a constant high level, for example by a battery. If the enable is driven low, the output voltage may be allowed to float or may go to ground. Input voltage signal levels may be in the approximate range of 1.5 volts to 5.5 volts.

In some embodiments a "break before make" transition from channel A to channel B, and vice versa, is provided to enable hot swapping between power supplies. In some further embodiments the system may be implemented on a single integrated circuit (IC) having an approximate size of 1 mm by 1.5 mm. The IC may be configured with two integrated P-channel power switches and associated analog control circuitry.

FIG. 2 illustrates a system truth table 200 consistent with various embodiments of the present disclosure. The truth table shows the state of the ouput $V_{out}$ in response to combinations of the control signal inputs including the enable signal and the select signal. When the enable is high, the select signal determines the state of $V_{out}$. In particular, when the select signal is low, $V_{out}$ may be coupled to $V_{inA}$, and when the select signal is high, $V_{out}$ may be coupled to $V_{inB}$.

Figure 3:
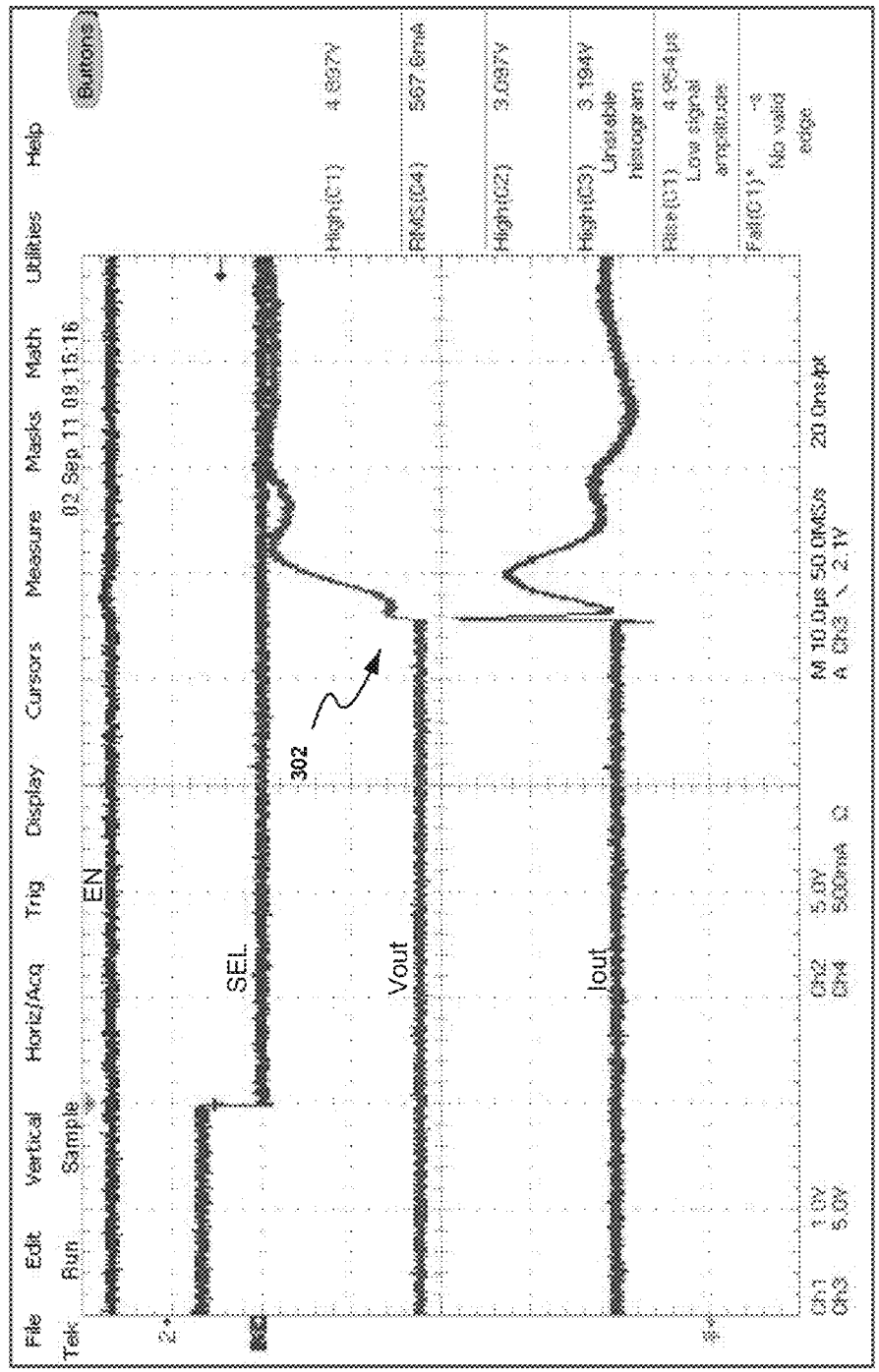
FIG. 3 illustrates system test results consistent with various embodiments of the present disclosure.

FIG. 3 illustrates system test results 300 consistent with various embodiments of the present disclosure. In an exemplary test of a system consistent with the present disclosure, capacitance of the output load at $V_{out}$ was set to 1 microFarad and the output load current was set to 500 mA. The signal plot shows the $V_{out}$ and corresponding $I_{out}$ waveforms in response to an input voltage switch from 3.3 volts to 5 volts. The results indicate that the system may operate with reduced voltage droop 302 on $V_{out}$ as a result of the switching transition.

Figure 4:
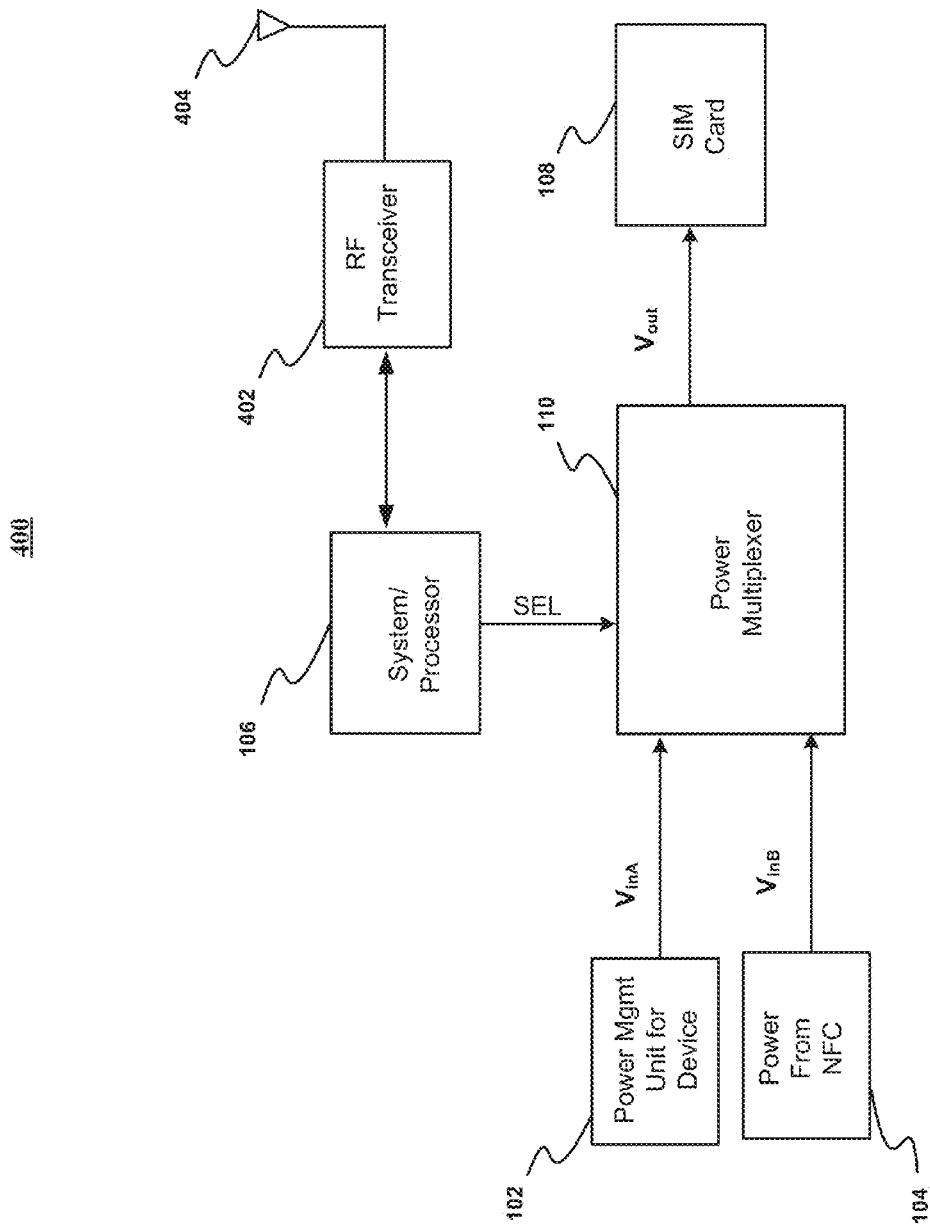
FIG. 4 illustrates a system diagram of a platform consistent with an exemplary embodiment of the present disclosure.

FIG. 4 illustrates a system diagram 400 of a platform consistent with an exemplary embodiment of the present disclosure. Platform 400 may be a wireless mobile communication device, such as, for example, a smartphone, a tablet, a laptop computing device or any other device configured to transmit or receive wireless signals. Platform 400 may include a processor 106, which in some embodiments may further include memory and an input/output (I/O) system. Platform 400 may include an RF transceiver 402 coupled to processor 106 and coupled to one or more an antennas 404. Platform 400 may further include a power management unit 102, a power providing NFC module 104 and a SIM circuit card 108. Processor 106 may control the select signal to power multiplexer 110 as described previously.

Figure 5:
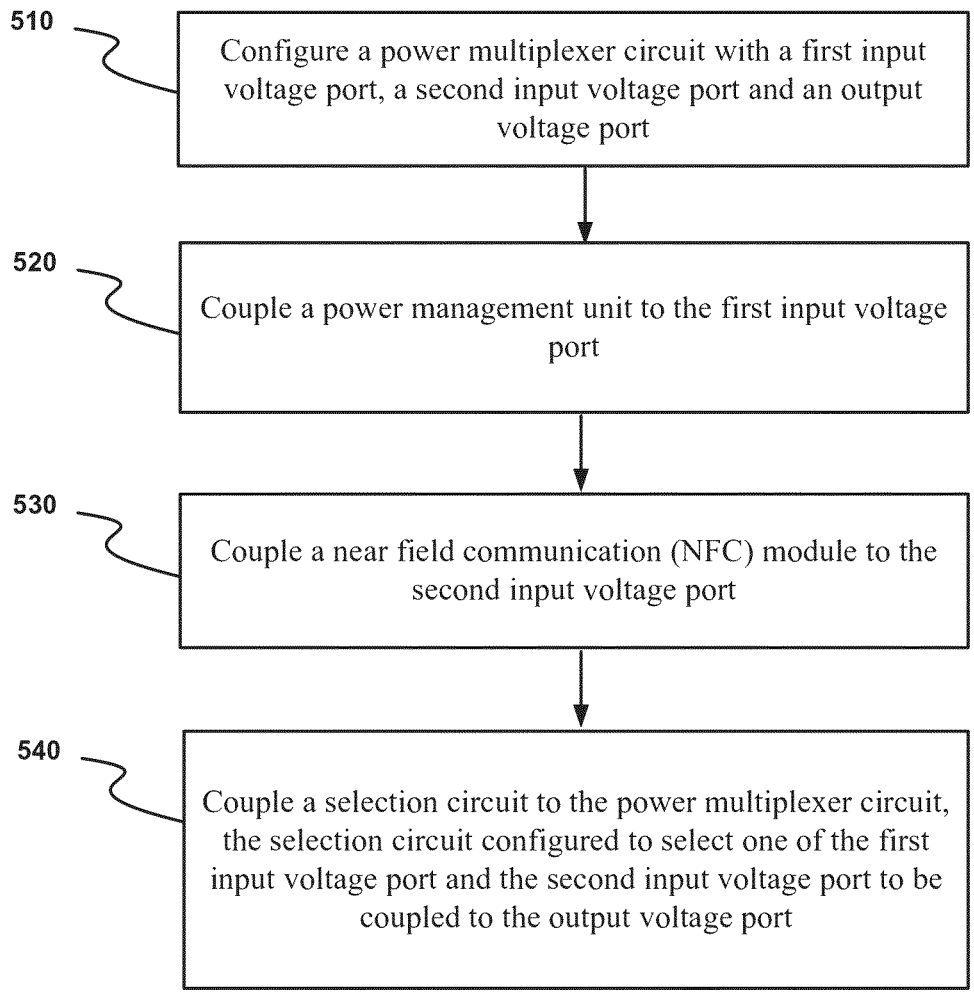
FIG. 5 illustrates a flowchart of operations of an exemplary embodiment consistent with the present disclosure.

FIG. 5 illustrates a flowchart of operations 500 of an exemplary embodiment consistent with the present disclosure. At operation 510, a power multiplexer circuit is configured with a first input voltage port, a second input voltage port and an output voltage port. At operation 520, a power management unit is coupled to the first input voltage port. At operation 530, a near field communication (NFC) module is coupled to the second input voltage port. At operation 540, a selection circuit is coupled to the power multiplexer circuit. The selection circuit is configured to select one of the first input voltage port and the second input voltage port to be coupled to the output voltage port.

Figure 6:
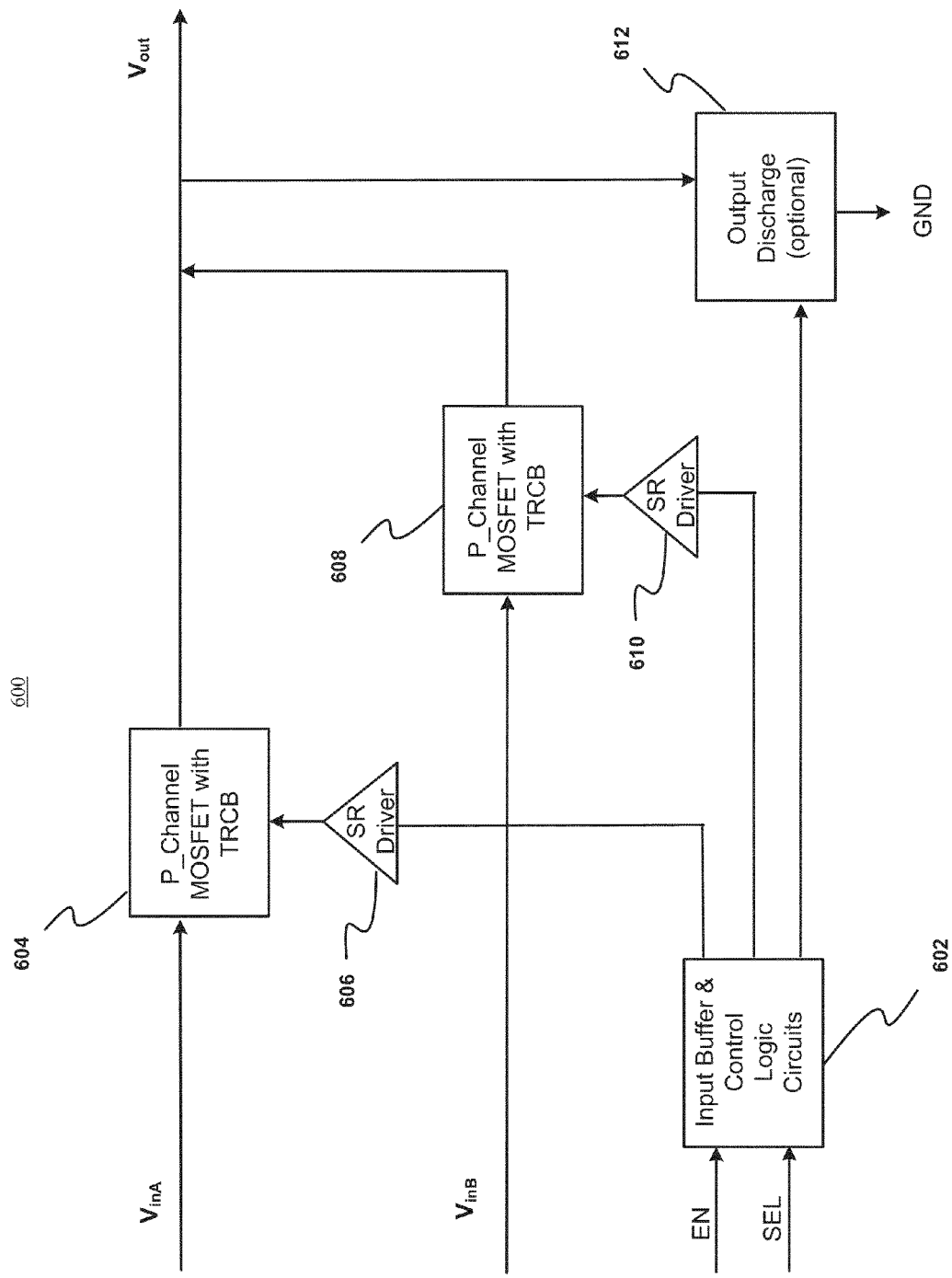
FIG. 6 illustrates a circuit block diagram consistent with various embodiments of the present disclosure.

FIG. 6 illustrates a circuit block diagram 600 consistent with various embodiments of the present disclosure. Details of a slew rate controlled version of power multiplexer 110 are shown. Power sources (not shown) may supply input voltages VinA and VinB respectively to slew rate controlled power multiplexer. Although only two inputs are shown here for illustration purposes, in practice any number of inputs could be provided. The slew rate controlled power multiplexer may be configured to switch between inputs VinA and VinB and electrically couple one of the inputs to an output port Vout. The multiplexer is further configured to provide TRCB between Vout and VinA in channel A, and between Vout and VinB in channel B.

Control signals, including an enable and a select may also be provided to the slew rate controlled power multiplexer, as will be explained below. In some embodiments, the power sources may be a wall adapter, for example a 5 volt wall adapter, and/or a wireless charging unit, for example a 5 volt 1 amp charging unit. Input voltages may be in the approximate range of 1.5 volts to 5.5 volts. In some embodiments, the output Vout may be coupled to a system that may include another charger and/or a battery to which power will be supplied for operation.

Input Buffer and control logic circuits 602 may be configured to determine which of the input supply voltages VinA or VinB, if either will be coupled to Vout based on the enable and control signals provided. Control logic circuit 602 drives P-Channel MOSFET TRCB switches 604 and 608 through slew rate driver 606 and slew rate driver 610 respectively to accomplish this switching. Slew rate drivers 606, 610 provide slew rate control so that P-Channel MOSFET switches 604, 608 can be turned on with the appropriate slew rate. An optional output discharge circuit 612 may be provided and controlled by control logic circuit 602.

In some embodiments a "break before make" transition from channel A to channel B, and vice versa, is provided to enable hot swapping between power supplies. In some further embodiments the system may be implemented on a single integrated circuit (IC) having an approximate size of 1 mm by 1.5 mm. The IC may be configured with two integrated P-channel power switches and associated analog control circuitry.

Figure 7:
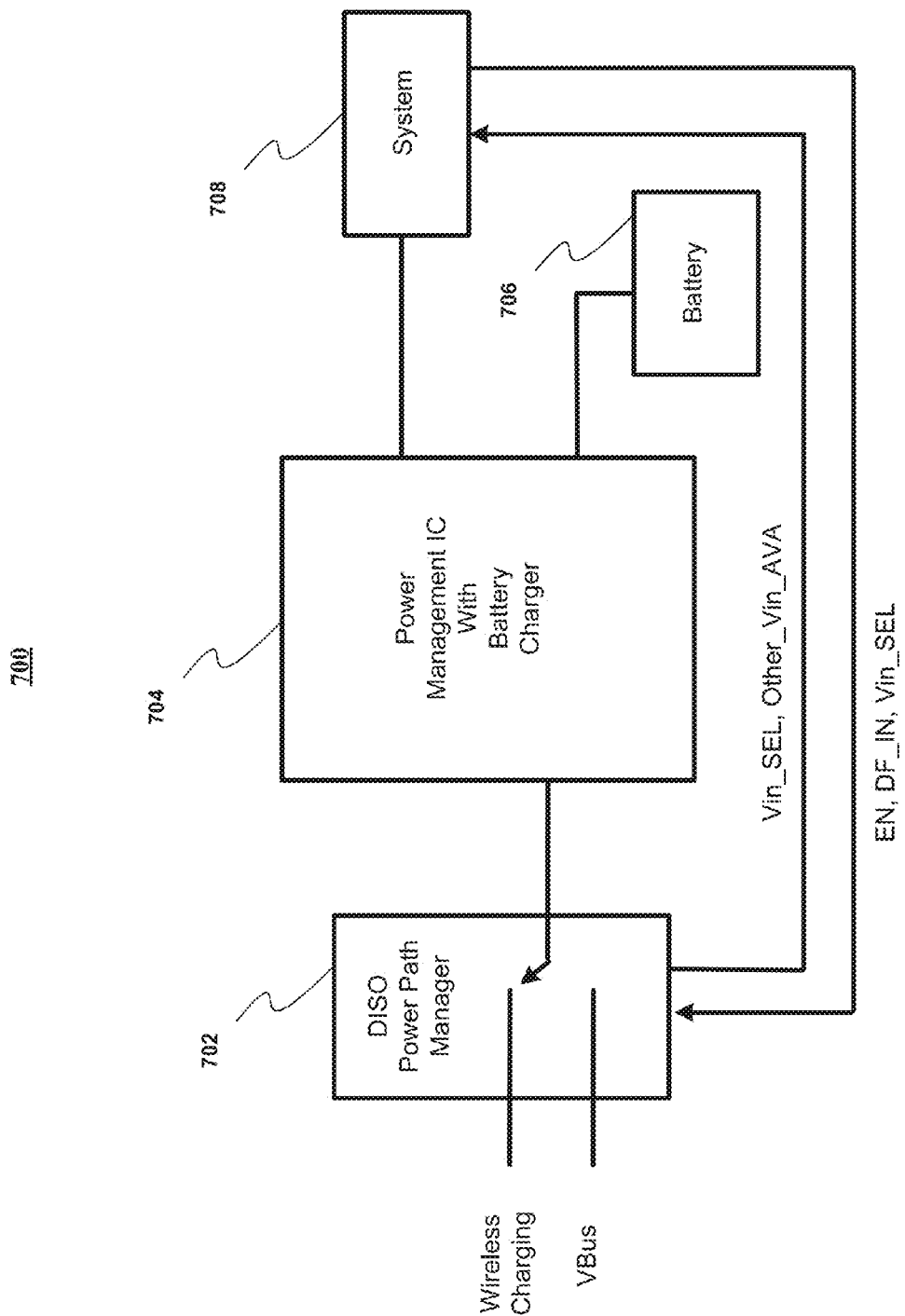
FIG. 7 illustrates a system diagram consistent with various embodiments of the present disclosure.

FIG. 7 illustrates a system diagram 700 consistent with various embodiments of the present disclosure. The DISO power path manager circuit 702 may be configured to receive input from two power sources one of which may be a wireless charging source and the other a USB power line (VBus). The DISO power path manager circuit 702 may be further configured to switch one of the power sources to an output port which may be coupled to a power management integrated circuit (PMIC) 704 associated with a system 708 which may be a device such as a mobile phone or other portable wireless device. The PMIC 704 may also be equipped with a battery charger to charge battery 706.

The DISO power path manager circuit 702 may further be configured to allow reverse current to flow on the Vbus input through a bi-directional switch, permitting operation of USB on-the-go (OTG) capability which enables the USB device to act as either a master or slave device. Control signals, including an enable and a select may also be coupled between the DISO power path manager circuit 702 and the system 708, as will be explained below. In some embodiments, under-voltage and over-voltage lockouts may be provided to protect the PMIC 704. Thermal shutdown protection may also be provided. A 50 msec delay may also be provided during power source switching.

In some embodiments the system may be implemented on a single integrated circuit (IC) having an approximate size of 1.8 mm by 2.0 mm.

Figure 8:
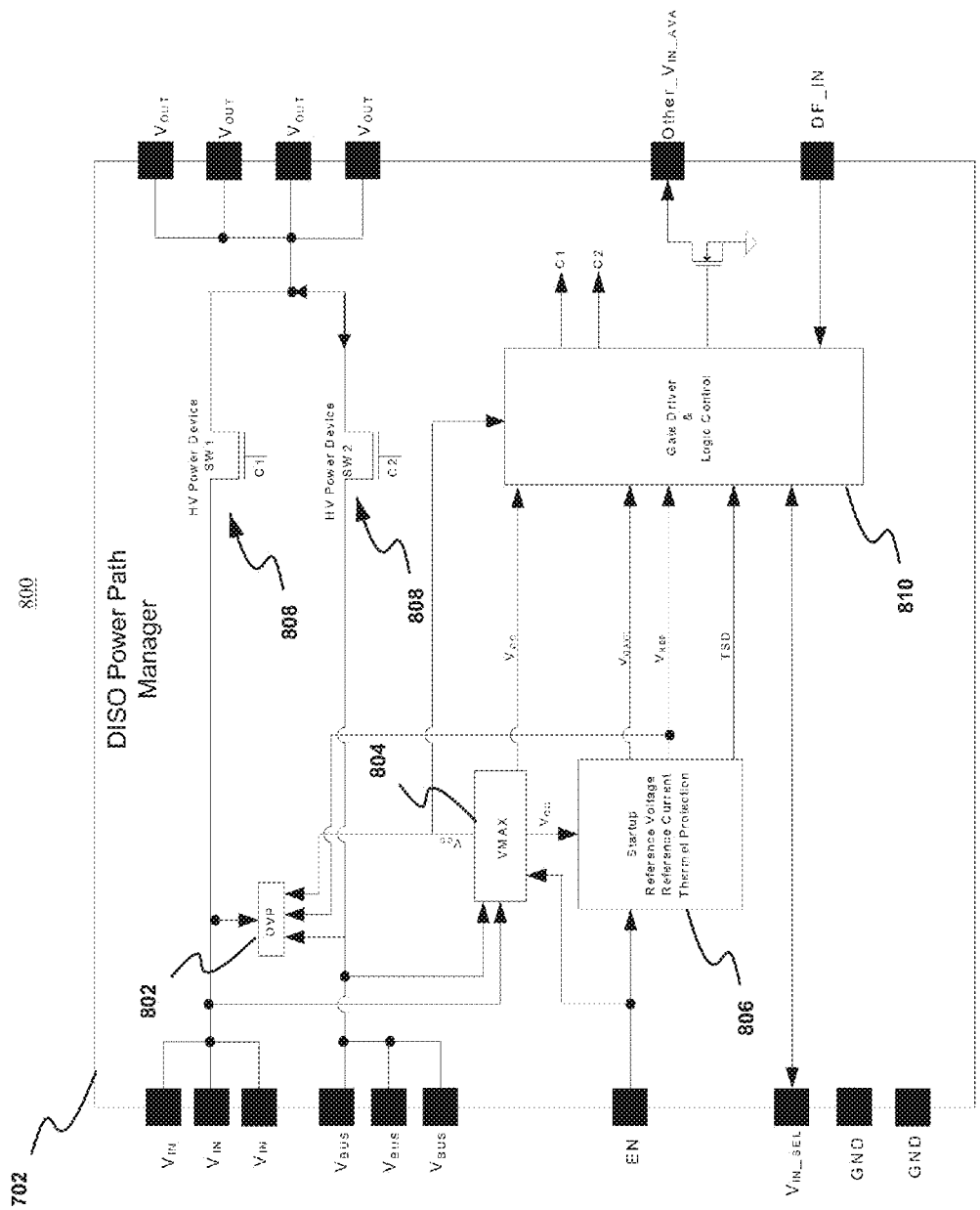
FIG. 8 illustrates a system block diagram consistent with various embodiments of the present disclosure.

FIG. 8 illustrates a system block diagram 800 consistent with various embodiments of the present disclosure. System block diagram 800 provides detail of the DISO power path manager circuit 702. Shown are overvoltage protection circuit 802, voltage maximum detection circuit 804, startup-reference voltage-reference current-thermal protection circuit 806, power switches 808, and gate driver and logic control circuit 810.

FIG. 9 illustrates a system truth table 900 consistent with various embodiments of the present disclosure. The truth table shows the state of the ouput Vout in response to combinations of the control signal inputs including the enable signal EN and the select signal VIN_SEL.

In a first case, the battery voltage is in a valid range and the EN signal is high. In this case, the output VOUT is selected from a valid VIN or VBUS based on the VIN_SEL signal which can be used to determine the priority of inputs when both input sources are available. The Other_VIN_AVA signal is provided to indicate, when high, that both input sources are available. In the absence of VIN, the EN signal may provide power to the DISO power path manager circuit 702 control logic to support USB OTG.

In a second case, the battery is depleted or the EN signal is low. In this case, a valid input source can power the system directly, based on automatic selection. If only one valid source is available, it is applied. If two valid sources are available, priority may be set by the DF_IN signal.

As used herein, use of the term "nominal" or "nominally" when referring to an amount means a designated or theoretical amount that may vary from the actual amount.

The term "switches" may be embodied as MOSFET switches (e.g. individual NMOS and PMOS elements), BJT switches and/or other switching circuits known in the art. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

Thus, the present disclosure provides systems, methods and platforms for power multiplexer switching operations. The system may include an NFC module configured to receive power through an RF channel. The system of this example may also include a SIM circuit configured with a supply voltage port. The system of this example may further include a power multiplexer circuit configured to controllably couple the SIM circuit supply voltage port to the NFC module, and the NFC module provides a supply voltage to the SIM circuit such that the SIM circuit is operable in the absence of primary device power source.

According to another aspect there is provided a method. The method may include configuring a power multiplexer circuit with a first input voltage port, a second input voltage port and an output voltage port. The method of this example may also include coupling a power management unit to the first input voltage port. The method of this example may further include coupling an NFC module to the second input voltage port. The method of this example may further include coupling a selection circuit to the power multiplexer circuit, the selection circuit configured to select one of the first input voltage port and the second input voltage port to be coupled to the output voltage port.

According to another aspect there is provided a platform. The platform may include a processor, an RF transceiver coupled to the processor and an antenna couple to the RF transceiver. The platform of this example may also include an NFC module configured to receive power. The platform of this example may further include a SIM circuit configured with a supply voltage port. The platform of this example may further include a power multiplexer circuit coupled to the processor, the power multiplexer circuit configured to controllably couple the SIM circuit supply voltage port to the NFC module, and the NFC module provides a supply voltage to the SIM circuit such that the SIM circuit is operable in the absence of primary device power source.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system, comprising:
    a near field communication (NFC) module configured to receive power through a radio frequency (RF) channel;
    a primary power source;
    a subscriber identity module (SIM) circuit configured with a supply voltage port; and
    a power multiplexer circuit configured to controllably couple said SIM circuit supply voltage port to said NFC module or said primary power source, wherein said power multiplexer circuit includes control logic coupled to slew rate (SR) drivers that each control transistors configured to couple each of said NFC module and said primary power source to said SIM circuit supply voltage port, each of said transistors having true reverse current blocking circuitry to prevent current from flowing back from said SIM circuit supply voltage port to said NFC module and said primary power source.

2. The system of claim 1, wherein said power multiplexer circuit further comprises:
    an output voltage port coupled to said SIM circuit;
    a first input voltage port coupled to said NFC module; and
    a second input voltage port coupled to a power management unit, said power management unit configured to provide said primary device power source.

3. The system of claim 1, further comprising a selection circuit coupled to said power multiplexer circuit, said selection circuit configured to select one of said first input voltage port and said second input voltage port to be coupled to said output voltage port.

4. The system of claim 1, wherein said power multiplexer circuit is deployed on an integrated circuit.

5. The system of claim 1, wherein said power multiplexer circuit breaks a connection between said first input voltage port and said output voltage port before said power multiplexer circuit makes a connection between said second input voltage port and said output voltage port.

6. The system of claim 1, wherein the voltage on said first and said second input voltage ports are in the range of 1.5 to 5.5 volts.

7. A method, comprising:
    configuring a power multiplexer circuit with a first input voltage port, a second input voltage port and an output voltage port;
    coupling a power management unit to said first input voltage port;
    coupling a near field communication (NFC) module to said second input voltage port; and
    receiving at least an enable signal and a select signal at control logic in said power multiplexer circuit; and
    causing, with said control logic based at least on said enable signal and said select signal, a slew rate driver in said power multiplexer circuit to control a transistor including true reverse current blocking circuitry in said power multiplexer circuit to couple said output voltage port to one of said first input voltage port or said second input voltage port.

8. The method of claim 7, further comprising coupling a SIM circuit to said output voltage port.

9. The method of claim 8, further comprising coupling said NFC module to said SIM circuit through said power multiplexer circuit in response to detecting the absence of power from said power management unit.

10. The method of claim 7, further comprising deploying said power multiplexer circuit on an integrated circuit.

11. The method of claim 7, further comprising breaking a connection between said first input voltage port and said output voltage port before making a connection between said second input voltage port and said output voltage port.

12. The method of claim 8, further comprising providing voltages on said first and said second input voltage ports in the approximate range of 1.5 to 5.5 volts.

13. A wireless communications platform comprising:
a processor;
an RF transceiver coupled to said processor;
an antenna couple to said RF transceiver;
a near field communication (NFC) module configured to receive power;
a primary power source;
a subscriber identity module (SIM) circuit configured with a supply voltage port; and
a power multiplexer circuit coupled to said processor, said power multiplexer circuit configured to controllably couple said SIM circuit supply voltage port to said NFC module or said primary power source, wherein said power multiplexer circuit includes control logic coupled to slew rate (SR) drivers that each control transistors configured to couple each of said NFC module and said primary power source to said SIM circuit supply voltage port, each of said transistors having true reverse current blocking circuitry to prevent current from flowing back from said SIM circuit supply voltage port to said NFC module and said primary power source.

14. The platform of claim 13, wherein said power multiplexer circuit further comprises:
an output voltage port coupled to said SIM circuit;
a first input voltage port coupled to said NFC module; and
a second input voltage port coupled to a power management unit, said power management unit configured to provide said primary device power source.

15. The platform of claim 13, further comprising a selection circuit coupled to said power multiplexer circuit, said selection circuit configured to select one of said first input voltage port and said second input voltage port to be coupled to said output voltage port.

16. The platform of claim 13, wherein said power multiplexer circuit is deployed on an integrated circuit.

17. The platform of claim 13, wherein said power multiplexer circuit breaks a connection between said first input voltage port and said output voltage port before said power multiplexer circuit makes a connection between said second input voltage port and said output voltage port.

18. The platform of claim 13, wherein the voltage on said first and said second input voltage ports are in the range of 1.5 to 5.5 volts.

19. The system of claim 1, wherein said power multiplexer circuit further comprises protection circuitry to protect against under-voltage, over-voltage and thermal-related failures.

20. The platform of claim 1, wherein said power multiplexer circuit further comprises protection circuitry to protect against under-voltage, over-voltage and thermal-related failures.

* * * * *